Jan. 4, 1949.  H. E. SCHLENZ  2,458,431
APPARATUS FOR AND METHOD OF DIGESTING GARBAGE
Filed April 20, 1944  2 Sheets-Sheet 1
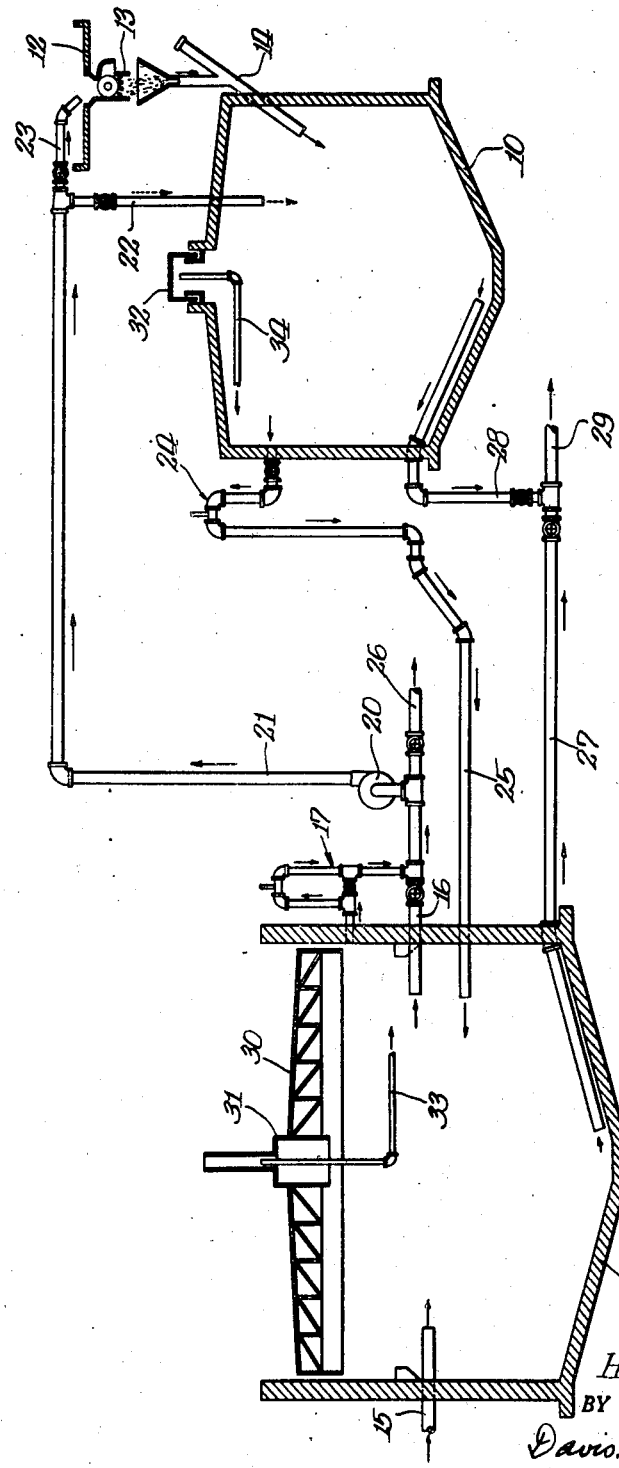
INVENTOR.
Harry E. Schlenz.
BY
Davis, Lindsey, Smith & Shonts
Attys.

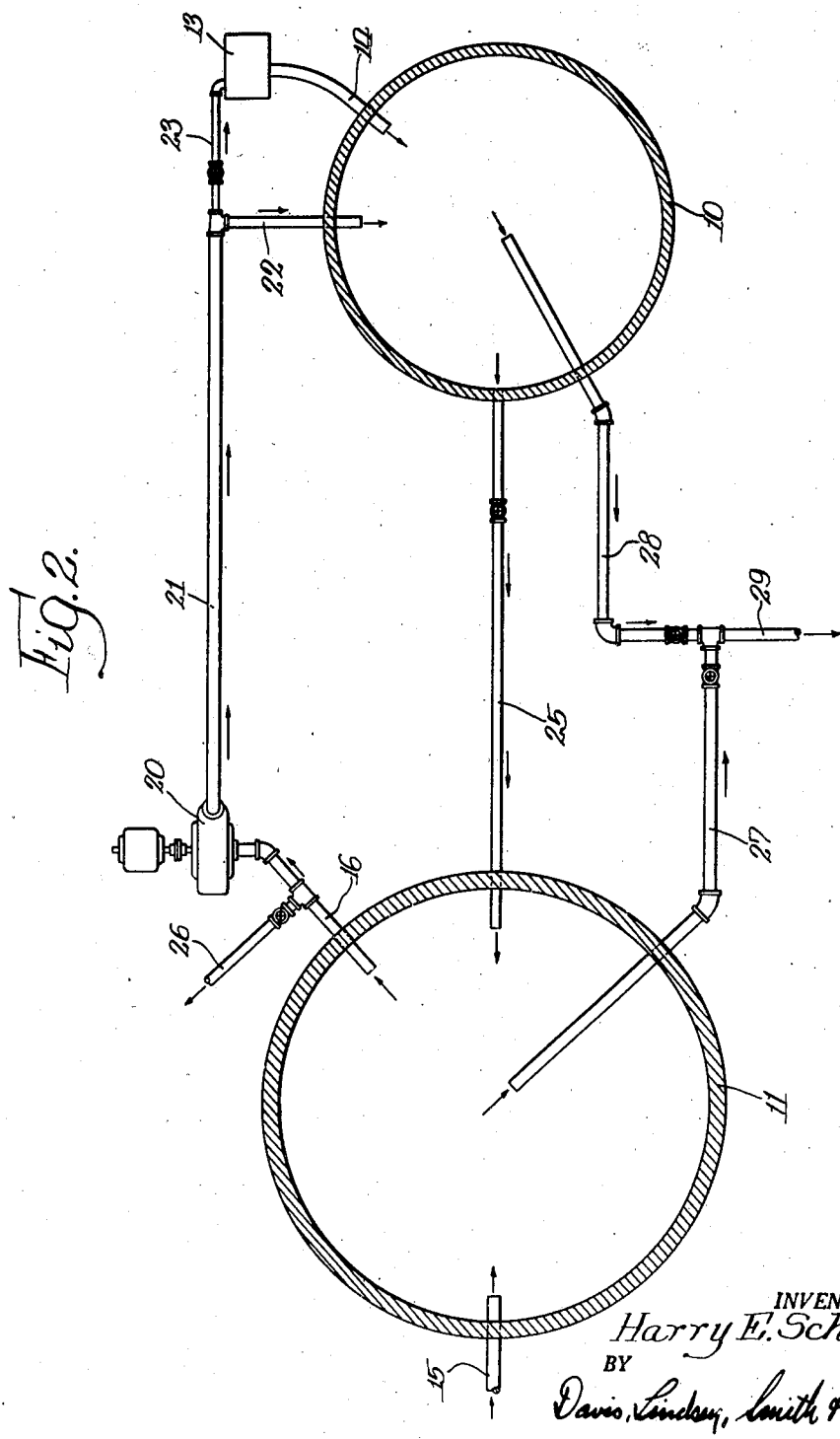

Patented Jan. 4, 1949

2,458,431

UNITED STATES PATENT OFFICE 2,458,431

APPARATUS FOR AND METHOD OF DIGESTING GARBAGE

Harry E. Schlenz, Glencoe, Ill., assignor to Pacific Flush Tank Company, Chicago, Ill., a corporation of Illinois Application April 20, 1944, Serial No. 531,917

10 Claims. (Cl. 195—104)

The invention relates generally to the disposal of garbage and, more particularly, to an apparatus for and a method of digesting by anaerobic decomposition organic waste products such as garbage, including both animal and vegetable matter.

The general object of the invention is to provide a novel method and apparatus for disposing of garbage by digestion, which requires a minimum of handling of the garbage, by which the garbage may be handled along with the disposal of sewage, and which does not require apparatus of a particularly large capacity and does not involve any great expense in operation of such apparatus.

Another object is to provide a novel method and apparatus of digesting garbage by anaerobic decomposition, by which acid fermentation of the garbage during the digestion process is prevented.

A further object is to provide a novel method and apparatus for digesting garbage, in which the amount of overflow or excess supernatant liquor is maintained at a minimum.

Still another object is to provide a novel method and apparatus for digesting garbage which may be carried on in connection with the digestion of sewage sludge solids, utilizing the supernatant liquor evolved in the digestion of the sewage sludge solids for effecting proper decomposition of the garbage, and which eliminates the necessity of adding water from an outside source in the grinding of the garbage preparatory for its digestion.

A still further object is to provide a novel method and apparatus for digesting garbage, by which non-digestible solids in the garbage, such as bone, glass and metal, are prevented from entering the sewage digestion system with which the apparatus cooperates, thereby avoiding any clogging of the pipes and valves of the system.

It is also an object to provide an apparatus for digesting garbage, which utilizes digested sewage sludge material to effect digestion of the highly acid garbage material without affecting the sewage digestion process.

Other objects and advantages will become apparent from the following description taken in connection with the accompanying drawings, in which:

Figure 1 is a diagrammatic vertical cross-sectional view showing apparatus embodying the features of the invention; and Fig. 2 is a diagrammatic plan view of the apparatus shown in Fig. 1.

In handling the disposal of organic waste products such as garbage, attempts have heretofore been made to digest the garbage by a process in which the garbage was placed in a decomposing container without the introduction of any other matter except water. It was soon found, however, that such a process was impractical due to the fact that fermentation of an acid type took place under such circumstances, with the result that all digestion activity was stopped by the production of such acid. Furthermore, an odorous, sticky, non-drainable product was thereby obtained which was, to say the least, difficult to handle.

It was later discovered that organic matter such as garbage could be digested by anaerobic decomposition if it were mixed with suitable quantities of domestic sewage sludge solids. Such mixture might be in a ratio of from 1 part of ground garbage to 0.7 parts of sewage sludge (on a volatile solids basis) to 1.0 part of ground garbage to 1.36 parts of sewage sludge. While such ratios are not necessarily limiting, it is known that digestion may be carried on at any point between such ratios, the preferred ratio being substantially 1:1. In average communities, it is found that the normal range of comparative weights of sewage sludge and garbage solids produced is in the ratio of approximately 1:1 so that the preferred ratio, from the standpoint of most effective digestion, is the same as the normal production of the constituents. It was also found that the time required for digestion of garbage and sewage solids is substantially the same as for the digestion of sewage solids alone, namely, 15 to 30 days as in established practice.

In prior attempts to effect digestion of a mixture of garbage solids with sewage sludge solids, the two have been mixed in the same container or receptacle. However, this has led to many serious problems which, from a practical standpoint, prohibited the use of such a process.

The principal problem arising is due to the non-digestible solids which garbage usually contains. It is accepted practice to remove large metal objects, large bones, large pieces of glass and other trash before the garbage is ground, but it is impossible to eliminate eggshells, small bones, etc., before grinding, and, in the process of grinding, such material is broken up and distributed throughout the garbage. Such material is of a heavy specific gravity and settles out of the liquids rather quickly, particularly in the pipes handling digested sludge. Thus, the pipes and valves of the system become clogged and impossible to use. In addition, small bones of "sliver-like" form interlace themselves in a mat along with particles of eggshells and glass and frequently completely block off entrances to withdrawal pipes to render the system completely inoperative unless constant attention is given to prevent such occurrences. But even with such constant attention the difficulty is present and the cost of the labor involved in preventing such occurrences renders the process impractical.

Grit chambers have been employed to settle out such heavy residue in an attempt to eliminate such objectionable material before reaching the pipes and valves of the digestion system, but so much organic matter is settled out along with the grit that further handling of such grit, other than mere removal, is required. In order to overcome the problems encountered in adding ground garbage solids directly to a sewage sludge digester, it has been the general practice to add the ground garbage solids to the raw sewage to be treated, whence it passes through grit chambers and then settling means wherein the garbage solids are partially settled out with the sewage solids. However, it is found that more than 25 per cent of the garbage solids added to the raw sewage passes out of the settling tank in the form of colloidal and dissolved constituents of the effluent. These constituents materially increase the Biochemical Oxygen Demand (B. O. D.) and consequently lessen the degree of treatment normally undergone by such effluent. If further treatment is provided for such effluent by means for effecting secondary oxidation, the load on such means is greatly increased, ranging in reported values from 11 to 100 per cent with an average of about 43 per cent. Furthermore, there is a considerable increase in the floating solids and grease formation in the effluent, which is difficult to collect and transfer to the digestion means and which introduces a sight and odor nuisance.

A further difficulty is encountered when garbage is introduced directly into the sewage sludge digester because of the fact that, in the grinding of garbage, water must be added during such step. The quantity of water so added materially increases the quantity of supernatant liquor in the digester to such an extent that the handling of the overflow liquor becomes a problem. Further, such overflow liquor, which for a normal sewage digester contains 500 to 5000 P. P. M. (0.05 to 0.5 per cent) of suspended solids, will contain 20,000 to 25,000 P. P. M. (2.0 to 2.5 per cent) of suspended solids. Such heavy liquor, because of its large organic content, results in an overloading of the secondary treatment processes normally provided therefor.

The present invention provides a method and apparatus for overcoming all of these difficulties, particularly in the larger capacity apparatus handling the sewage sludge solids. To this end, I provide a separate container or receptacle in which digestion of garbage solids takes place and, during the digestion of the garbage solids therein, the environment of the sewage sludge digester is maintained and continually brought in contact with the garbage solids. Thus, the garbage is maintained in a zone supplied with the active organisms derived as an incident to and effecting digestion of the sewage, with the garbage segregated from the sewage digestion zone. Preferably, this is accomplished by providing a separate container or tank to receive the garbage solids and into which supernatant liquor from the sewage sludge digester is continually introduced during the digestion process. Overflow from the garbage digester is returned to the sewage sludge digester.

Thus, the non-digestible material in the garbage is confined to the garbage digester and cannot find its way to the sewage digester nor other parts of the system. Consequently it does not affect the sewage digestion tank or the system. The problem, then, of clogging of drains, piping, etc., is thereby materially reduced and confined to predetermined points and does not extend throughout the entire system. The only portion of the garbage which finds its way to the sewage digester are the light, non-gritty solids which become decomposed during the process and will form no undesirable residue in the piping. Hence the sewage treatment process is not disturbed. The non-digestible material remaining in the garbage digester may be removed after the completion of the digesting period.

Furthermore, the tendency of the garbage toward acid fermentation is prohibited by the supernatant liquor from the sewage digester so that the digestion action in the garbage digester will continue until complete. A rapid digestion of the garbage solids is effected due to the continual contact with active seeding material obtained from the more stable sewage sludge digestion, the beneficial organisms from the sewage sludge being continually supplied to the garbage digester to support throughout the process the anaerobic decomposition.

The supernatant liquor resulting from such a system is held to a minimum, since no additional water is added to the system in the grinding operation of the garbage. The liquid necessary for such grinding operation is provided by a flow of the supernatant liquor from the sewage digester. The introduction of such liquor in the grinding step attains the further advantage of intimately mixing the liquor with the ground garbage upon the introduction of the latter into the digester, and thus distributes active seeding organisms throughout the ground material for a rapid start of digestion activity. Further, the reduction in quantity of overflow liquor for the system as a whole does not necessitate any increase in the process of treatment thereafter accorded to the digested material. The optimum digestion temperature is readily maintained in the garbage digester without the use of supplemental heating means, since sufficient heat may be supplied to the garbage digester by circulation of the supernatant liquor from such sludge digester. This results in material savings in cost of the apparatus and maintenance thereof.

In the drawings, I have illustrated diagrammatically a system by which the process may be readily carried out. Such system comprises a tank or receptacle 10 in which digestion of the garbage takes place and which may be placed adjacent a sewage sludge digester 11. Garbage, after having been dumped, may be carried by a conveyor to a sorting floor 12 where large objects, such as metal pieces, large bones or glass, may be removed. From the sorting floor 12 the garbage is passed through a grinder, indicated at 13, from which it is discharged into the tank 10 through an inlet 14.

The sewage sludge digester 11 is provided with an inlet conduit or pipe 15 through which the sludge settled out of raw sewage is delivered into the digester. Supernatant liquor containing active seeding organisms is withdrawn from the sewage digester 11 through a withdrawal conduit 16 or through an overflow control device, indicated generally at 17. The flow from the conduit 16 or overflow device 17 is then forced by a circulating pump 20 through a conduit 21 to a point adjacent the garbage digester 10.

From the conduit 21, supernatant liquor from the sewage digester may be introduced into the garbage digester 10 through either of two paths. It may be directly introduced into the digester 10 through a discharge pipe 22 to be mixed in the digester with the ground garbage therein. To provide the necessary liquid for grinding of the garbage, a branch discharge pipe 23 is provided which discharges a controlled quantity of the liquor into the grinder 13. Such quantity is intimately mixed with the ground garbage and aids in starting the decomposition process as the garbage passes into the digester 10. The continual supply of the liquor from the sewage sludge digester to the garbage through the discharge pipes 22 and 23 provides for rapid digestion of the garbage within the tank 10.

The liquor within the garbage digester is maintained at a desired level by an overflow control device 24 which permits the withdrawal of the excess liquor and the return thereof to the sewage digester through a conduit 25. Thus, there is a continual transfer of the supernatant liquor of the sewage digester 11 to the garbage digester 10 and return thereof to the sewage digester. Such continual transfer of the liquor to the garbage digester maintains the supply of active organisms sufficient to effect the decomposition within the garbage digester and at the same time avoids an excess of liquid in the system as a whole, since no water from an outside source need be introduced during the process. However, should there be an excess of overflow liquor in the system, such excess may be discharged from the conduit 16 through a discharge pipe 26 for such further treatment as may be desirable, it being noted that such excess is withdrawn only from the sewage sludge digester 11 and not from the garbage digester 10. Thus, a minimum of secondary treatment will be required for the withdrawn overflow since the colloidal matter from the garbage contained in the overflow will be at a minimum.

Upon the completion of the digestion process, the digested sludge may be removed from the sewage digester 11 through a discharge conduit 27, and from the garbage digester 10 through a conduit 28, the conduits 27 and 28 preferably being connected and carrying the digested sludge to a point of disposal through a pipe indicated at 29. The non-digestible solids from the garbage are confined to digester 10 and may be removed therefrom readily without having to clear out the piping of the system for this purpose and without disturbing the sewage sludge digestion process, where formerly when garbage was digested in the sewage digester, it was necessary to halt operation at times to clear out the system.

It is found that a substantial quantity of gas is generated during this process, both in the sewage digester 11 and in the garbage digester 10. Such gas is found to be produced in quantities of 10 to 14 cubic feet per pound of volatile solids digested and has a methane content of from 60 to 70 per cent. Such gas is valuable for generation of power or for heating purposes and, for that reason, means are provided for collecting the gas both in the sewage digester and in the garbage digester. Thus, the sewage digester is provided with a cover 30 having a gas-collecting dome 31, while the garbage digester may be provided with a gas-collecting dome 32, the gas collected in the two domes 31 and 32 being piped through gas lines 33 and 34 to a convenient point of use or storage.

From the foregoing description, it will be apparent that I have provided a novel method and apparatus for disposing of garbage by anaerobic decomposition, which reduces the handling of the garbage to a minimum and which permits of the disposal of such garbage along with the treatment of sewage. The apparatus for such decomposition of the garbage is of relatively simple structure, capable of handling large volumes of garbage at small operational expense. The process herein disclosed avoids numerous difficulties heretofore encountered, such as preventing the acid fermentation of the garbage and the difficulties resulting from the indigestible solids of the garbage. It will be particularly noted that the process does not result in an excess of supernatant liquor, requiring extensive further treatment, so that secondary processes normally available for the treatment of sewage may be used in connection with the system without overtaxing their capacity and without affecting their normal operation.

The terms "supernatant liquor," "digester liquor," "liquor of digestion" and "actively digesting material" as used herein and in the art designate material such as that comprising the portion of the contents of a digester which contains organic material undergoing digestion, including solid, gas-lifted particles in suspension, solids in solution and liquids, as contrasted to the solids in the digester which have undergone digestion and are not gas-lifted and which consequently settle to the bottom portion of the digester.

I claim:

1. The method of digesting garbage material which comprises the steps of grinding a mass of garbage, feeding the ground mass to a zone sealed against the admission of air for decomposition therein, feeding sewage sludge to a zone separated and distinct from said first zone and sealed against the admission of air for anaerobic decomposition therein, continually passing liquor of digestion from said sewage sludge digestion zone to said garbage digestion zone for promoting and maintaining anaerobic digestion in said garbage digestion zone and maintaining the temperature of the digesting garbage mass at substantially the temperature of the digesting sewage sludge mass, returning liquor of digestion from said garbage digestion zone to said sewage sludge digestion zone where it is commingled with the mass digesting in said sewage sludge digestion zone so that it is conditioned similarly to the liquor of digestion in said sewage sludge digestion zone, and passing the finally digested liquor from the sewage sludge digestion zone to point of disposal.

2. The method of digesting garbage material which comprises the steps of grinding a mass of garbage, feeding the ground mass to a zone sealed against the admission of air for decomposition therein, feeding sewage sludge to a zone separated and distinct from said first zone and sealed against the admission of air for anaerobic decomposition therein, continually passing liquor of digestion from said sewage sludge digestion zone to said garbage digestion zone for promoting and maintaining anaerobic digestion in said garbage digestion zone and maintaining the temperature of the digesting garbage mass at substantially the temperature of the digesting sewage sludge mass, mixing liquor of digestion from said sewage sludge digestion zone at substantially the temperature of the material in such zone with said garbage material as it is being ground to facilitate the grinding thereof, returning liquor of digestion from said garbage digestion zone to said sewage sludge digestion zone where it is commingled with the mass digesting in said sewage sludge digestion zone so that it is conditioned similarly to the liquor of digestion in said sewage sludge digestion zone, and passing the finally digested liquor from the sewage sludge digestion zone to point of disposal.

3. The method of digesting garbage which comprises the steps of feeding sewage sludge to a digestion zone wherein it is subjected to anaerobic digestion, feeding garbage to a separate and distinct digestion zone adapted for anaerobic digestion continually supplying said garbage digestion zone with liquor comprising actively digesting material evolved from the anaerobic digestion of sludge in said sewage sludge digestion zone to thereby subject said garbage to anaerobic digestion under temperature and digesting conditions similar to those in said sewage sludge digestion zone, and returning the effluent from said garbage digestion zone to said sewage sludge digestion zone for remixture with the sewage sludge digesting in said latter zone prior to delivery to a point of disposal.

4. The method of digesting garbage which comprises the steps of feeding sewage sludge to a zone wherein it is subjected to anaerobic digestion, feeding garbage to a separate and distinct zone adapted for anaerobic digestion, continually feeding liquor comprising actively digesting material from the sewage sludge digestion zone to the garbage digestion zone in substantially the same condition in which it appears in the sewage sludge digestion zone and in sufficient quantity to maintain anaerobic digestion in said garbage digestion zone under conditions similar to those in the sewage sludge digestion zone, and returning the effluent from said garbage digestion zone to said sewage sludge digestion zone for remixture with the sewage sludge digesting in the latter zone to condition it for final disposal.

5. The method of digesting garbage which comprises grinding garbage in the presence of material evolved from the anaerobic digestion of sewage sludge and containing active seeding material, passing the ground and seeded garbage to an anaerobic digestion zone continually, introducing into the garbage in said digestion zone liquor comprising actively digesting material evolved from the anaerobic digestion of sewage sludge to maintain anaerobic digestion of said garbage while maintaining said digesting garbage segregated from the digesting sewage sludge, returning the effluent from said garbage digestion zone to said sewage sludge digestion zone for re-mixture with the sewage sludge digesting in the latter zone, and removing digested sludge from said garbage digestion zone.

6. The method of digesting garbage which comprises passing the garbage to an anaerobic digestion zone, introducing into the garbage prior to introduction of said garbage into said digestion zone liquor comprising actively digesting material evolved from the anaerobic digestion of sewage sludge in a zone separated and distinct from said garbage digestion zone, continually introducing liquor comprising actively digesting material from said sewage sludge digestion zone into said garbage in said garbage digestion zone after said garbage has been passed to said garbage digestion zone to maintain anaerobic digestion of said garbage, discharging excess liquor from said garbage digestion zone into said sewage sludge digestion zone where it is admixed with the sewage sludge material digesting therein, and removing the digested sludge from said digestion zones, respectively, and the excess liquor from said sewage sludge digestion zone.

7. The method of digesting garbage which comprises passing garbage to an anaerobic digestion zone for anaerobic digestion therein, passing to a separate and distinct anaerobic digestion zone for anaerobic digestion therein sewage sludge in the ratio of at least 0.7 part of sewage sludge (dry weight volatile solids basis) to 1.0 part of garbage (dry weight volatile solids basis), maintaining the digesting mass of garbage segregated from the digesting mass of sewage sludge, circulating actively digesting material from said sewage sludge digesting zone to said garbage digestion zone to maintain anaerobic digestion of said garbage and effluent from said garbage digestion zone to said sewage sludge digestion zone, and removing digested sludge from said digestion zones, respectively, and effluent from said sewage sludge digestion zone.

8. The method of digesting garbage which comprises passing the garbage to an anaerobic digestion zone, passing sewage sludge to an anaerobic digestion zone separated from the garbage digestion zone, maintaining the contents of the sewage sludge digestion zone at a proper temperature to support anaerobic digestion thereof, passing actively digesting material evolved from the digestion of said sewage sludge into said garbage digestion zone at a rate to maintain the garbage sufficiently seeded and at a proper temperature to support anaerobic digestion thereof, and returning the effluent from said garbage digestion zone to said sewage sludge digestion zone where it is commingled with the mass digesting in said sewage sludge digestion zone so that it is conditioned similarly to the liquor of digestion in said sewage sludge digestion zone.

9. Apparatus for digesting garbage comprising a closed tank sealed against the admission of air and adapted for the anaerobic digestion of garbage, means including an inlet conduit for passing garbage into said garbage digestion tank, a closed tank sealed against the admission of air and adapted for the anaerobic digestion of sewage sludge therein, means including an inlet conduit for passing sewage sludge into said sewage sludge digestion tank, means providing with said tanks a closed continuous circulation system and including a conduit leading from the upper portion of said sewage sludge digestion tank at the level of the digester liquor therein to said garbage digestion tank, a pump connected in said conduit for continually passing digester liquor from said sewage sludge digestion tank to said garbage digestion tank, and means including a conduit leading from the upper portion of said garbage digestion tank to said sewage sludge digestion tank for returning overflow liquor from said garbage digestion tank to said sewage sludge digestion tank, means including a conduit for discharging effluent from said sewage sludge digestion tank, and means including discharge outlets leading from the lower portion of each of said tanks respectively at the level of the digested sludge therein for discharging said digested sludge therefrom.

10. Apparatus for digesting garbage comprising a closed tank sealed against the admission of air and adapted for the anaerobic digestion of garbage, means for grinding garbage, means including a conduit for passing ground garbage into said garbage digestion tank, a closed tank sealed against the admission of air and adapted for the anaerobic digestion of sewage sludge, means including an inlet conduit for passing sewage sludge into said sewage sludge digestion tank, means providing with said tanks a closed continuous circulation system and including a conduit leading from the upper portion of said sewage sludge digestion tank at the level of the digester liquor therein to said garbage digestion tank, a pump connected in said conduit for continually passing digester liquor from said sewage sludge digestion tank to said garbage digestion tank, means including a conduit connected with said sewage sludge digestion tank and said grinding means for passing digester liquor from said sewage sludge digestion tank to said grinding means for admixture with said garbage, and means including a conduit leading from the upper portion of said garbage digestion tank to said sewage sludge digestion tank for returning overflow liquor from said garbage digestion tank to said sewage sludge digestion tank, means including a conduit for discharging effluent from said sewage sludge digestion tank, and means including discharge outlets leading from the lower portion of each of said tanks respectively at the level of the digested sludge therein for discharging said digested sludge therefrom.

HARRY E. SCHLENZ.

REFERENCES CITED

The following references are of record in the file of this patent:

UNITED STATES PATENTS

| Number | Name | Date |
|---|---|---|
| 1,595,445 | Boggiano | Aug. 10, 1926 |
| 1,832,179 | Boggiano | Nov. 17, 1931 |
| 2,246,224 | Streander | June 17, 1941 |

OTHER REFERENCES

Boruff-Ind. Eng. Chem. 25, 703–6 (1933).

Buswell, Indus. & Eng. Chem., "Complete Treatment of Distillery Wastes," July 1936, vol. 28, No. 7, pages 795–797.